United States Patent
Moteki et al.

(12) 
(10) Patent No.: US 6,175,742 B1
(45) Date of Patent: *Jan. 16, 2001

(54) IMAGE TRANSMISSION APPARATUS INCLUDING MAIN AND SUB FACSIMILE UNITS DESIGNED TO ESTABLISH RADIO COMMUNICATING THEREBETWEEN RESPONSIVE TO A FIELD STRENGH DETECTED IN THE RADIO SIGNAL

(75) Inventors: Masayuki Moteki, Yokohama; Yukari Hashibe, Tokyo, both of (JP)

(73) Assignee: Matsushita Graphic Communications Systems, Inc., Tokyo (JP)

( * ) Notice: Under 35 U.S.C. 154(b), the term of this patent shall be extended for 0 days.

This patent is subject to a terminal disclaimer.

(21) Appl. No.: 09/081,822

(22) Filed: May 20, 1998

Related U.S. Application Data

(63) Continuation of application No. 08/548,633, filed on Oct. 26, 1995, now Pat. No. 5,832,385.

(30) Foreign Application Priority Data

Oct. 27, 1994 (JP) .................................................. 6-263601

(51) Int. Cl.[7] .................................................. H04Q 7/20
(52) U.S. Cl. .................... 455/462; 379/100.01; 358/442; 712/1
(58) Field of Search .................... 379/100.1; 358/442; 380/9; 455/462

(56) References Cited

U.S. PATENT DOCUMENTS

| | | | |
|---|---|---|---|
| 5,200,991 | * | 4/1993 | Motoyanagi ........................ 379/100.1 |
| 5,237,429 | * | 8/1993 | Zuiss et al. .......................... 358/442 |
| 5,353,329 | * | 10/1994 | Hayashi .............................. 379/100.1 |
| 5,410,599 | * | 4/1995 | Crowley et al. .......................... 380/9 |
| 5,519,763 | * | 5/1996 | Namekawa et al. .............. 379/100.1 |
| 5,805,678 | * | 9/1998 | Okamoto et al. .................. 379/100.1 |
| 5,832,385 | * | 11/1998 | Moteki et al. ........................ 455/462 |
| 6,035,205 | * | 3/2000 | Han ...................................... 455/462 |
| 6,105,121 | * | 8/2000 | Hirsh ........................................ 712/1 |

FOREIGN PATENT DOCUMENTS 4-115762   4/1992   (JP) .

* cited by examiner

Primary Examiner—William Cumming

(57) ABSTRACT

An image transmission apparatus is provided which includes a main unit and a sub-unit. The sub-unit has a facsimile function, and communicates with the main unit by radio. The main unit is connected to a facsimile machine using a telephone line, and operates in a radio transmission mode and a facsimile mode. The radio transmission mode is to transmit a facsimile signal together with an operation procedure signal transmitted from the facsimile machine to the sub-unit, and transmit an operation procedure signal sent from the sub-unit to the facsimile machine through the telephone line. The facsimile mode is to establish facsimile communication with the facsimile machine instead of the sub-unit when a level of the field strength of a radio signal from the sub-unit becomes smaller than a preselected level.

4 Claims, 7 Drawing Sheets

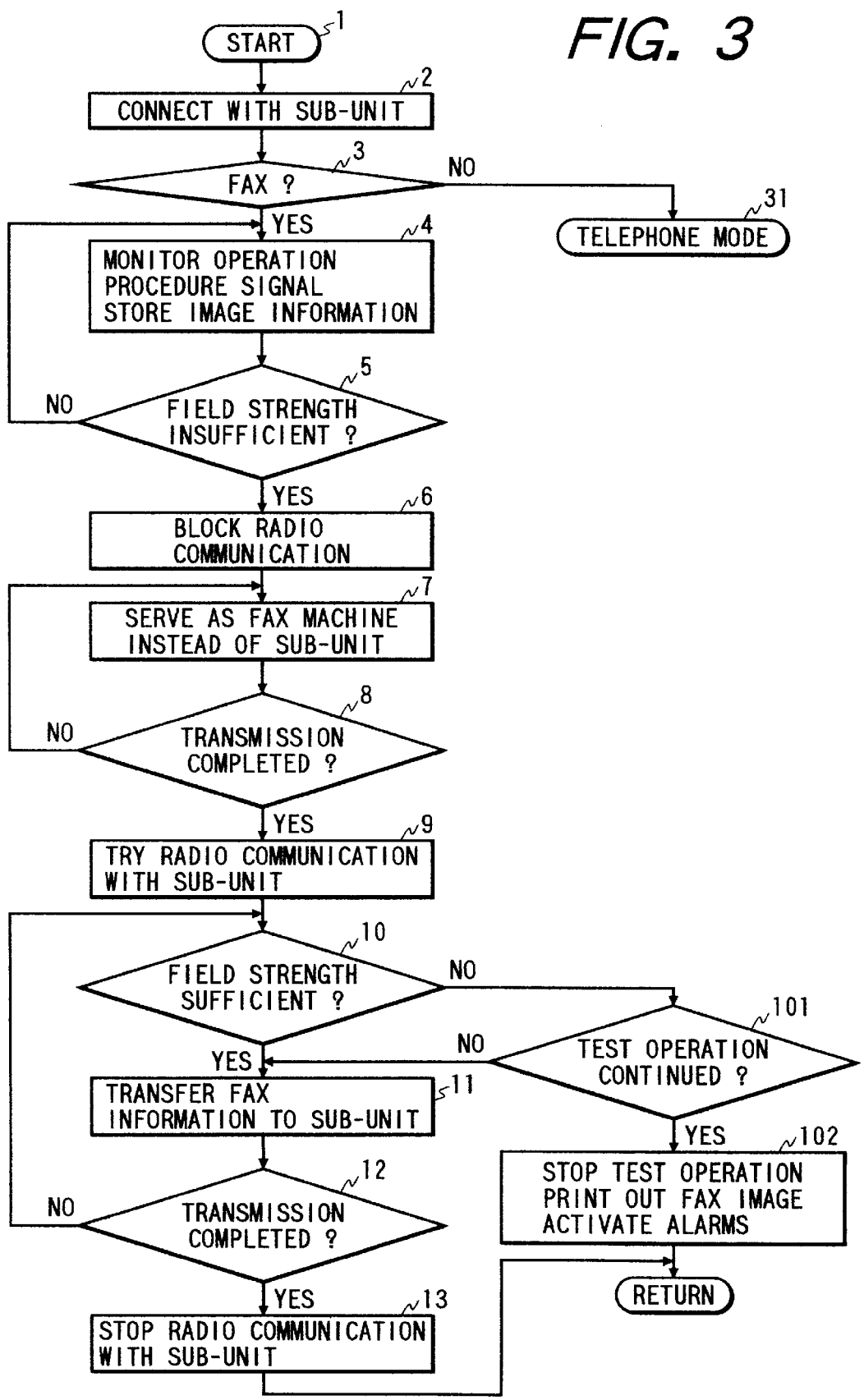

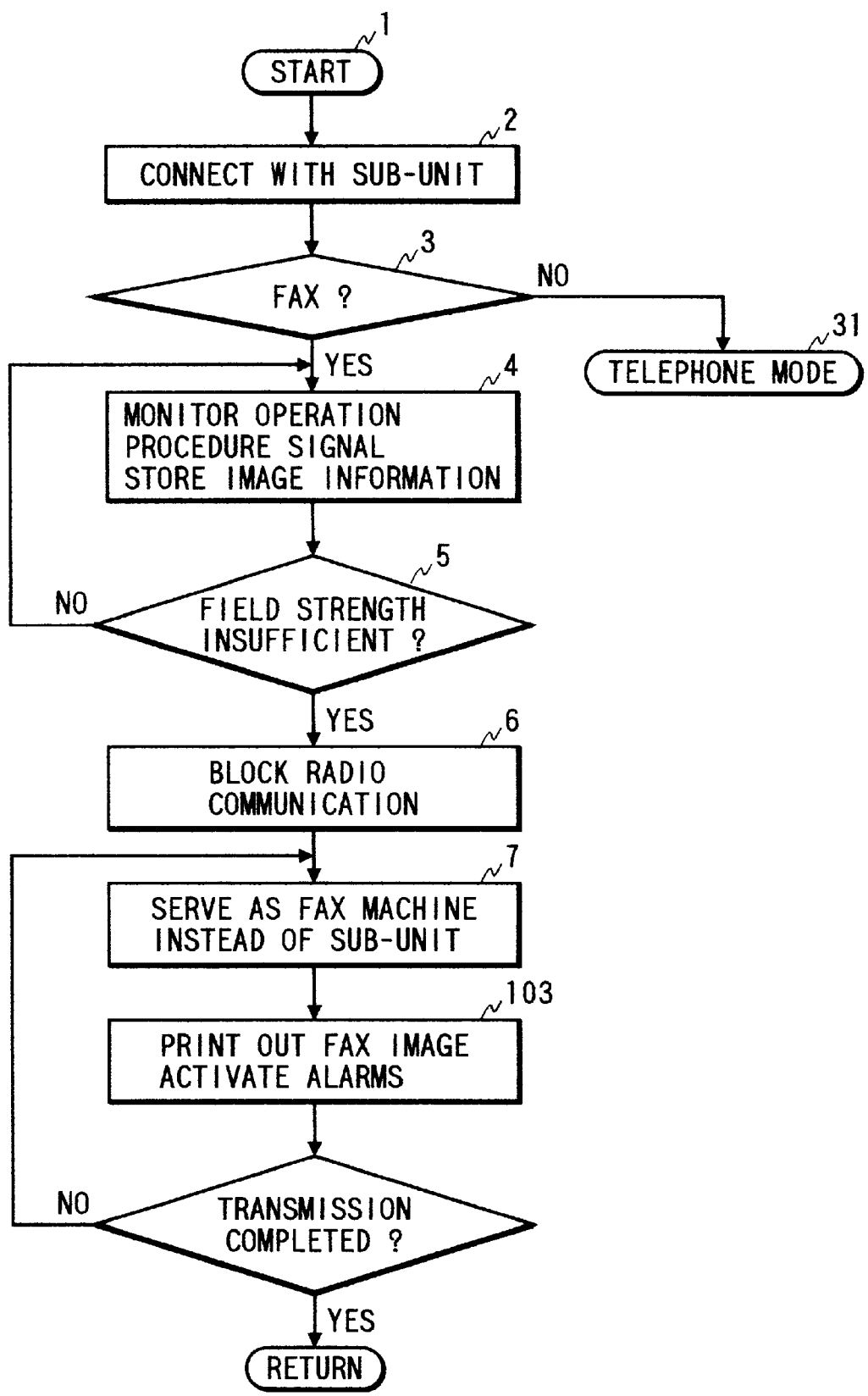

| READING MODE | FIELD STRENGTH | FAX IMAGE DENSITY | |
|---|---|---|---|
| HYPER-FINE | HIGH | R16 × 15.4 (dot/mm) | HYPER-FINE VARIABLE RANGE |
| | MID | R12 × 15.4 (dot/mm) | |
| | LOW | R8 × 15.4 (dot/mm) | |
| SUPER-FINE | HIGH | R8 × 15.4 (dot/mm) | SUPER-FINE VARIABLE RANGE |
| | MID | R8 × 11.55 (dot/mm) | |
| | LOW | R8 × 7.7 (dot/mm) | |
| FINE | HIGH | R8 × 7.7 (dot/mm) | FINE VARIABLE RANGE |
| | MID | R8 × 5.775 (dot/mm) | |
| | LOW | R8 × 3.85 (dot/mm) | |
| NORMAL | — — | R8 × 3.85 (dot/mm) | NORMAL RANGE |

IMAGE TRANSMISSION APPARATUS INCLUDING MAIN AND SUB FACSIMILE UNITS DESIGNED TO ESTABLISH RADIO COMMUNICATING THEREBETWEEN RESPONSIVE TO A FIELD STRENGH DETECTED IN THE RADIO SIGNAL

This application is a continuation of application Ser. No. 08/548,633 filed Oct. 26, 1995 now U.S. Pat. No. 5,832,385.

BACKGROUND OF THE INVENTION

1. Technical Field

The present invention relates generally to an image transmission apparatus which establishes facsimile communication with a facsimile machine through a telephone line, and more particularly to an image transmission apparatus which includes a main facsimile unit connected to a telephone line and a sub-facsimile unit communicating with the main unit by radio.

2. Background Art

Japanese Patent First Publication No. 4-115762 teaches, as shown in FIG. 8, a conventional facsimile machine which consists of a main unit 100 and a sub-unit 200. The main unit 100 has a communication controller receiving a telephone signal through a telephone line 350. The sub-unit 200 has facsimile terminal equipment. The main unit 100 and the sub-unit 200 also have transceivers 112 and 202, respectively, for radio transmission therebetween. The transceiver 112 transmits facsimile information from a calling party's facsimile machine 300 along with an operating procedure signal to the transceiver 202. The transceiver 202 of the sub-unit 200 transmits an operating procedure signal to be sent to the facsimile machine 300 to the transceiver 112 of the main unit 100.

A communication condition between the facsimile machine 300 connected to the main unit 112 through the telephone line 350 and the sub-unit 200 connected to the main unit 100 depends upon a radio transmission condition between the main unit 100 and the sub-unit 200 as well as a telephone communication condition. Thus, even if the telephone communication condition is good, a communication failure may occur or a retry operation may be performed many times as long as the radio communication condition is unstable, thus resulting in an increase in wasteful use of the telephone line.

SUMMARY OF THE INVENTION

It is therefore a principal object of the present invention to avoid the disadvantages of the prior art.

It is another object of the present invention to provide an image transmission apparatus which is designed to establish fine facsimile communication regardless of a radio communication condition between a main unit and a sub-unit for eliminating wasteful use of a telephone line.

According to one aspect of the present invention, there Is provided an image transmission apparatus which comprises a first unit having a facsimile function, a second unit receiving a facsimile signal from a calling party's facsimile machine through a telephone line, a field strength detecting means for detecting a level of field strength of the radio signal transmitted from the first unit to the second unit, and a switching means for switching an operation mode of the second unit. The second unit operates in a radio transmission mode and a facsimile mode. The radio transmission mode is to transmit the received facsimile signal together with an operation procedure signal to the first unit using a radio signal and also transmit an operation procedure signal sent from the first unit using a radio signal to the calling party's facsimile machine through the telephone line for establishing facsimile communication between the calling party's facsimile machine and the first unit. The facsimile mode is to establish facsimile communication with the calling party's facsimile machine instead of the first unit. The switching means switches between the radio transmission mode and the facsimile mode of the second unit according to the level of the field strength detected by the field strength detecting means. Specifically, the switching means controls the second unit so as to operate in the facsimile mode when the level of the field strength becomes smaller than a preselected level.

In the preferred mode of the invention, the second unit includes a memory for storing therein the facsimile signal in the facsimile mode. The second unit transmits the facsimile signal stored in the memory to the first unit after completion of the facsimile communication with the calling party's facsimile machine in the facsimile mode when the field strength detected by the field strength detecting means exceeds the preselected level.

The second unit includes a memory for storing therein all of the facsimile signal transmitted from the calling party's facsimile machine. The second unit may transmit all of the facsimile signal stored in the memory to the first unit after completion of the facsimile communication with the calling party's facsimile machine in the facsimile mode when the field strength detected by the field strength detecting means exceeds the preselected level.

The second unit includes informing means for informing an operator of a failure of radio communication between the first and second units when the radio communication is blocked for a preselected period of time after the field strength detected by the field strength detecting means is decreased below the preselected level.

The first unit includes informing means for informing an operator of a failure of radio communication between the first and second units when the radio communication is blocked for a preselected period of time after the field strength detected by the field strength detecting means is decreased below the preselected level.

The second unit has printing means for printing out the facsimile signal received in the facsimile mode.

The second unit includes a first communication control portion establishing transmission of the operation procedure signals between the second unit and the calling party's facsimile machine, a second communication control portion establishing transmission of the operation procedure signals between the second unit and the first unit, and a monitor portion monitoring an operation procedure signal-transmitted condition between the first unit and the calling party's facsimile machine. When the level of the filed strength of the radio signal detected by the field strength detecting means is greater than the preselected level, the first and second communication control portions establishes communication between the first unit and the calling party's facsimile machine, while when the level of the field strength of the radio signal is smaller than the preselected level, the first communication control portion produces an operation procedure signal corresponding to an operation procedure signal to be produced by the first unit and transmits the same to the calling party's facsimile machine.

According to another aspect of the present invention, there is provided an image transmission apparatus which comprises a main unit provided to be connected to a telephone line, a sub-unit performing a facsimile operation, a radio communication establishing means for establishing radio communication between the main unit and the sub-unit to transfer facsimile image information and an operation procedure signal using a radio signal, a field strength detecting means for detecting a field strength of the radio signal, and a partially processing means for partially processing the facsimile image information according to the field strength detected by the field strength detecting means.

In the preferred mode of the invention, a transmission image density control means is further provided for controlling the partially processing means to adjust the density of a facsimile image provided by the facsimile image information transmitted from the main unit to the sub-unit according to the field strength detected by the field strength detecting means and an image-reading density signal provided by the calling party's facsimile machine.

The image transmission apparatus further includes an image reading unit mounted in the sub-unit for reading a facsimile image of a document, an image-reading density selecting means for selecting between a higher density mode and a lower density mode, a transmission image density control means for controlling the partially processing means to adjust the density of the facsimile image read by the image reading unit to be transmitted to the main unit according to the field strength detected by the field strength detecting means and one of the higher density mode and the lower density mode selected by the image-reading density selecting means.

Each of the higher and lower density mode s ha s a plurality of density levels. The transmission image density control means sets the density of the facsimile image to one of the density levels of the selected one of the higher and lower density modes according to the field strength detected by the field strength detecting means.

BRIEF DESCRIPTION OF THE DRAWINGS

The present invention will be understood more fully from the detailed description given hereinbelow and from the accompanying drawings of the preferred embodiment of the invention, which, however, should not b e taken to limit the invention to the specific embodiment but are for explanation and understanding only.

In the drawings:

FIG. 3 is a flowchart which shows an operation performed by an image transmission apparatus;

FIG. 5 is a flowchart which shows a modification of the operation shown in FIG. 3;

DESCRIPTION OF THE PREFERRED EMBODIMENT

Figure 1:
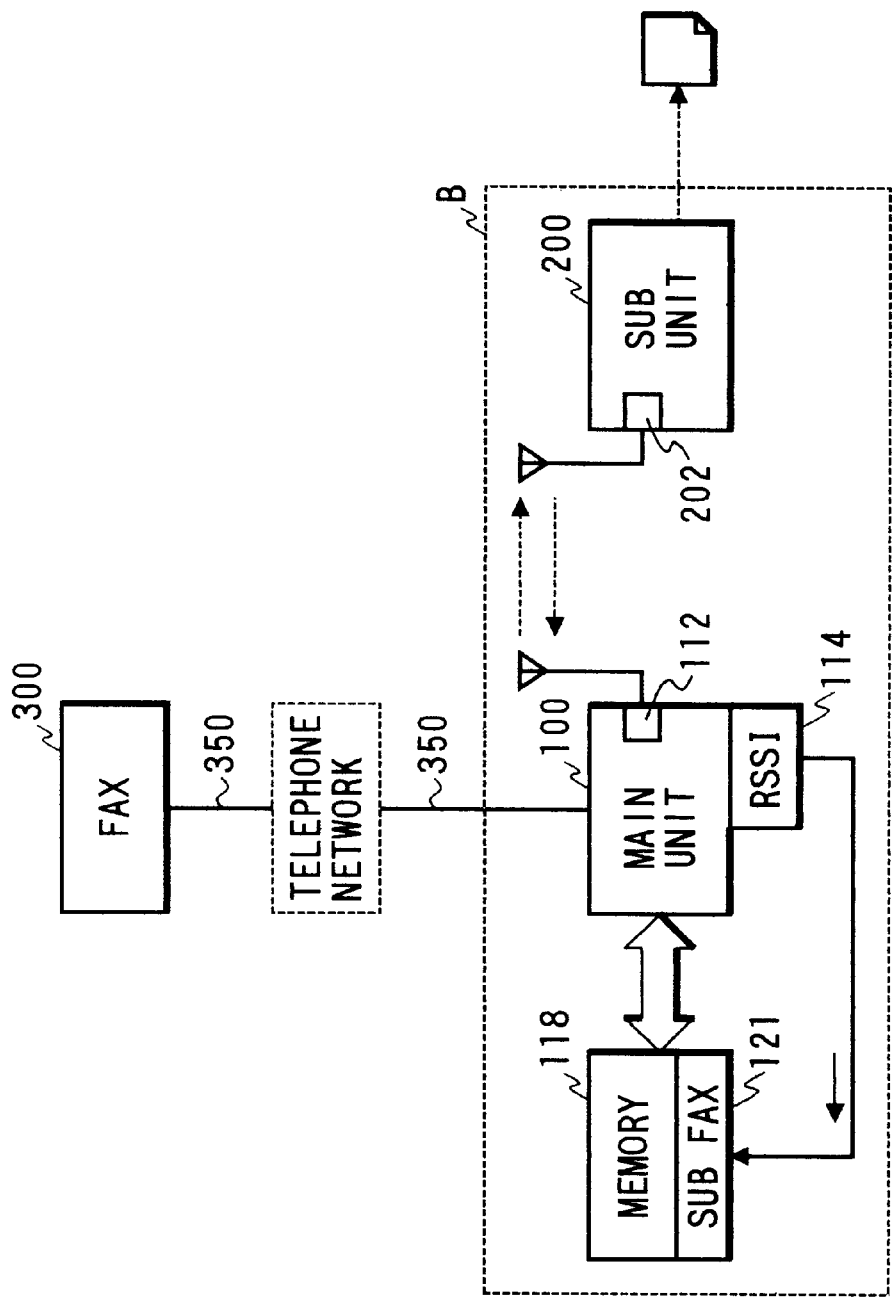
FIG. 1 is a block diagram which shows an image transmission apparatus according to the present invention.

Referring now to the drawings wherein like reference numbers refer to like parts in several views, particularly to FIG. 1, there is shown an image transmission apparatus according to the present invention.

The image transmission apparatus is of a codeless type which generally includes a main unit 100, a sub-unit 200, an image information memory 118, and a main unit controller 121. The main unit 100 is connected to facsimile terminal equipment 300 through a telephone line 350.

Figure 2A:
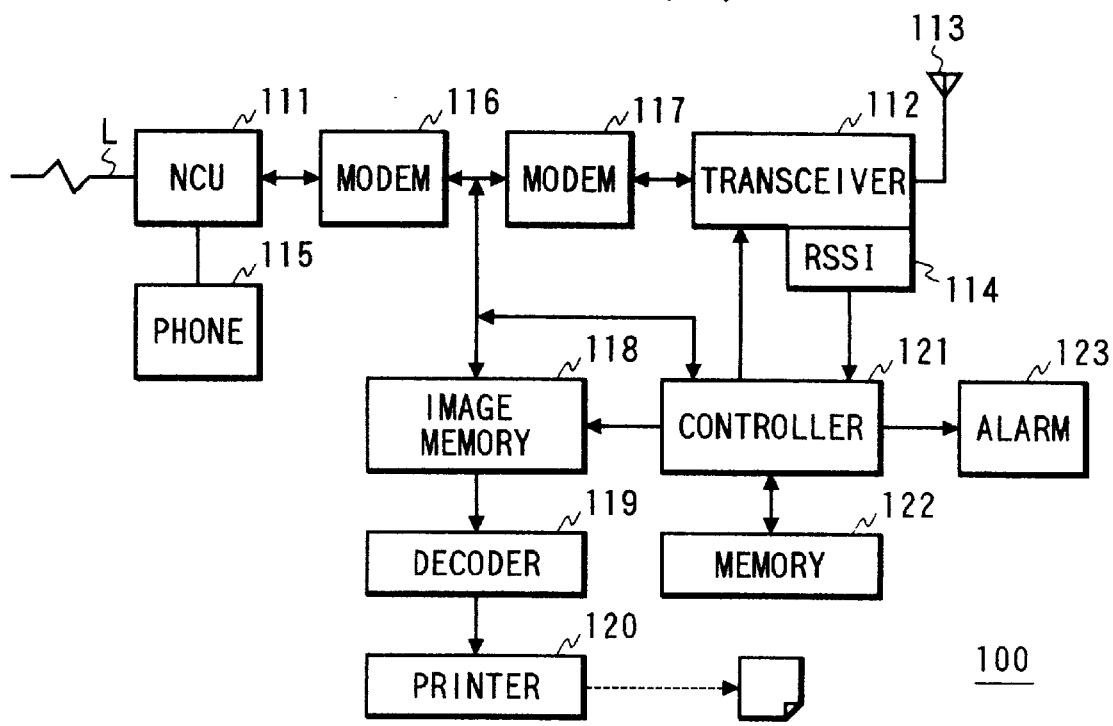
FIGS. 2(a) and 2(b) are circuit diagrams which show a main unit and a sub-unit of an image transmission apparatus, respectively.

The main unit 100, as shown in FIG. 2(a), includes a network control unit (NCU) 111, modems 116 and 117, a transceiver 112, an antenna 113, a received signal strength indicator (RSSI) 114, a telephone set 115, an image information memory 118, a decoder 119, a printer 120, a main unit controller 121, an operation procedure memory 122, and an alarm 123.

Figure 2B:
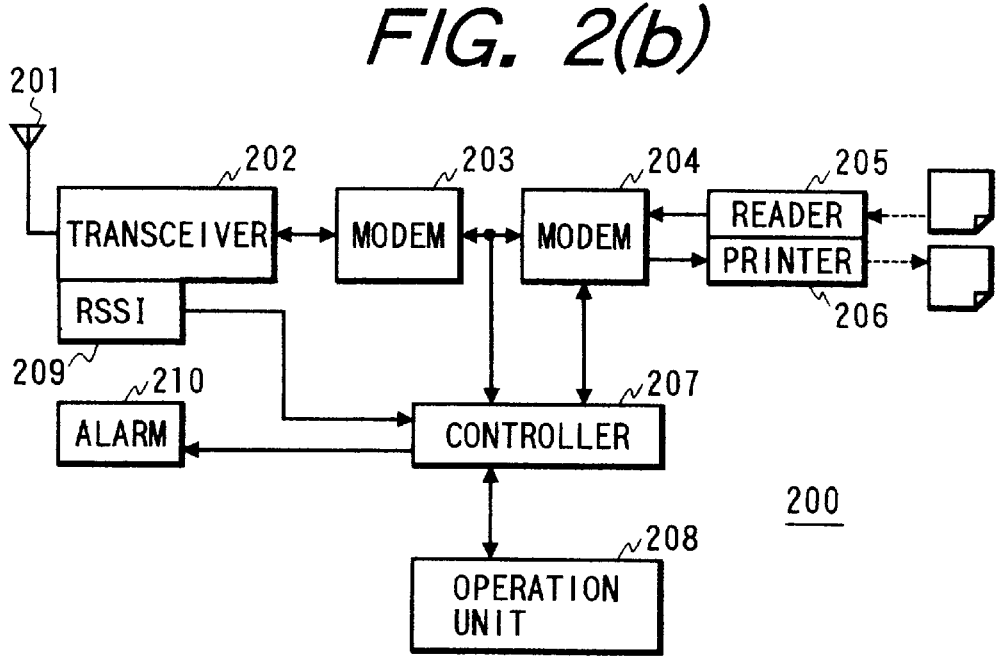

The sub-unit 200, as shown in FIG. 2(b), includes an antenna 201, a transceiver 202, a modem 203, a decoder/encoder (modem) 204, a document reader 205, an image printer 206, a received signal strength indicator 209, a sub-unit controller 207, an operation controlling unit 208, and an alarm 210.

The main unit controller 121 and the sub-unit controller 207 are both provided with microprocessors, respectively.

The main unit 100 serves as a ratio junction station which establishes facsimile communication between the facsimile terminal equipment 300 and the sub-unit 200. Specifically, the main unit 100 transmits facsimile information received through the telephone line 350 along with operation procedure signals (e.g., a Digital Command Signal (DCS), a Training Check (TCF) signal, a Multipage signal (MPS), etc. in FIG. 4) to the sub-unit 200 by radio, and transmits operation procedure signals (e.g., a Digital Identification signal (DIS), a Confirmation to Receive (CFR) signal, a Message Confirmation (MCF) signal, etc. in FIG. 4) send from the sub-unit 200 by radio to the facsimile terminal equipment 300 through the telephone line 350. During this operation of the main unit 100, the main unit controller 121 serves as a first communication control portion, a second communication control portion, and a monitor portion. The first communication control portion establishes transmission of the operation procedure signals between itself and the facsimile terminal equipment 300 through the telephone line 350. The second communication control portion establishes radio communication of the operation procedure signals between itself and the sub-unit 200. The monitor portion monitors signal-transmitted conditions of the operation procedure signals between the sub-unit 200 and the facsimile machine 350. Specifically, the monitor portion monitors how far the operation procedure signals (including leading operation procedure information, facsimile transmission information, and trailing operation procedure information) have been transmitted between the sub-unit 200 and the facsimile machine 350.

When the received signal strength indicator 114 detects the field strength of a preselected level enough to establish radio communication between the main unit 100 and the sub-unit 200, the main unit controller 121 connects the telephone line 350 with the sub-unit 200 through the first and second communication control portions, while when the field strength becomes smaller than the preselected level, the main unit controller 121 provides, instead of the sub-unit 200, an operation procedure signal to the facsimile machine 300 through the first communication control portion based on the signal-transmitted conditions monitored by the monitor portion. In other words, when the field strength detected by the received signal strength indicator becomes smaller than the preselected level, the main unit controller 121 serves as an auxiliary facsimile machine which performs a facsimile operation instead of the sub-unit 200.

The image information memory 118 stores therein image information from the facsimile terminal equipment 300. This image information is transmitted by ratio to the sub-unit 200 under control of the main unit controller 121 when the radio communication between the main unit 100 and the sub-unit 200 is recovered after completion of a facsimile operation of the main unit 100.

The alarm 123 raises an alarm when the field strength of a radio signal from the sub-unit 200 becomes smaller than the preselected level and when a radio communication with the sub-unit 200 is not achieved for a given period of time to inform a facsimile operator of such a failure under control of the main unit controller 121.

The printer 120 prints out the image information received by the main unit 100 when a given condition, as will be described later in detail, is met.

The sub-unit 200 has a facsimile transmission function of establishing facsimile communication with the facsimile machine 300 through the main unit 100 according to a given operation procedure under control of the sub-unit controller 207.

The alarm 210 raises an alarm when the field strength of a radio signal from the main unit 100 becomes smaller than the preselected level and when a radio communication with the main unit 100 is not achieved for a given period of time to inform the facsimile operator of such a failure under control of the sub-unit controller 207.

Referring to FIG. 3, there is shown a flowchart of a program or sequence of logical steps performed by the image transmission apparatus.

The program is initiated in step 1 upon reception of a signal through the telephone line 350.

The routine proceeds to step 2 wherein a radio connection is established between the main unit 100 and the sub-unit 200.

The routine then proceeds to step 3 wherein it is determined whether the received signal is a facsimile signal from the facsimile terminal equipment 300 or not. If a YES answer is obtained, then the routine proceeds to step 4 wherein operation procedure signals are monitored which are moved between the facsimile machine 300 and the sub-unit 200 through the main unit 100 and the telephone line 350 to determine how far the operation procedure signals have been transmitted, and then image information (e.g., PIX-2 in FIG. 4) from the facsimile machine 300 is stored in the image information memory 118 of the main unit 100.

If a NO answer is obtained in step 3 meaning that the received signal is not a facsimile signal from the facsimile machine 300, then the routine proceeds to step 31 wherein the image transmission machine is subjected to a normal telephone mode.

After step 4, the routine proceeds to step 5 wherein it is determined whether the field strength is decreased below the preselected level or not.

If a NO answer is obtained meaning that a fine radio connection is established between the main unit 100 and the sub-unit 200, then the routine returns back to step 4. The main unit 100 then establishes radio communication between the telephone line 350 and the sub-unit 200 to transfer the facsimile image information received from the facsimile machine 300 to the sub-unit 200 along with the operation procedure signals and output the operation procedure signals sent by the sub-unit 200 to the telephone line 350. This allows the sub-unit 200 to start to print out the facsimile image information from the facsimile terminal equipment 300.

Alternatively, if a YES answer is obtained meaning that the field strength of a radio signal received by the main unit 100 is decreased, causing the radio communication between the main unit 100 and the sub-unit 200 to be unstable, then the routine proceeds to step 6 wherein the radio communication is blocked.

Figure 4:
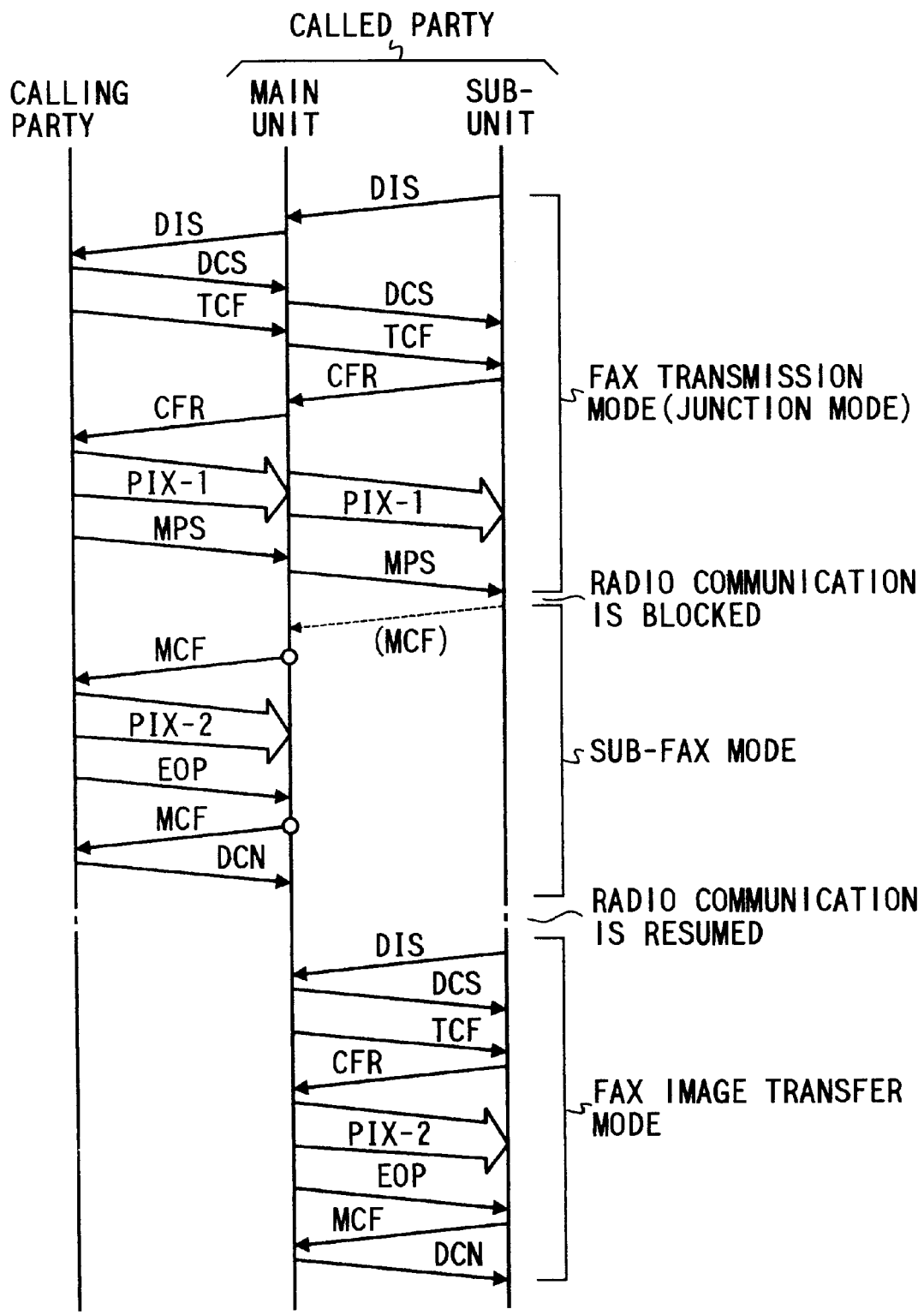
FIG. 4 is a sequential chart which shows a sequential operation performed by an image transmission apparatus.

The routine then proceeds to step 7 wherein the main unit 100 serves as the auxiliary facsimile machine to produce an operation procedure signal (e.g., a Message Confirmation (MCF) signal in FIG. 4) instead of the sub-unit 200 and output it to the facsimile terminal equipment 300. Thus, the facsimile communication is maintained regardless of a radio transmission condition between the main unit 100 and the sub-unit 200.

The routine then proceeds to step 8 wherein it is determined whether the facsimile communication between the facsimile terminal equipment 300 and the main unit 100 is completed or not. If a YES answer is obtained, then the routine proceeds to step 9 wherein the main unit 100 tries performing a test transmission operation for resuming the radio communication with the sub-unit 200.

The routine then proceeds to step 10 wherein it is determined whether the field strength is recovered to be greater than the preselected level or not. If a YES answer is obtained meaning that the radio communication with the sub-unit 200 is resumed by recovery of the field strength greater than the preselected level, then the routine proceeds to step 11 wherein the facsimile image information stored in the image information memory 118 of the main unit 100 is read out, and then transferred to the sub-unit 200 through radio communication.

The routine then proceeds to step 12 wherein it is determined whether the transfer of the facsimile image information to the sub-unit 200 is completed or not. The routine then proceeds to step 13 wherein the radio communication with the sub-unit 200 is stopped.

If the radio communication between the main unit 100 and the sub-unit 200 is degraded while the sub-unit 200 receives the facsimile image information from the facsimile terminal equipment 300, only the remainder of the facsimile image information not received by the sub-unit 200 is transferred from the image information memory 118 of the main unit 100 to the sub-unit 200, however, it may be possible to transmit all pages of the facsimile image information to the sub-unit 200.

If a NO answer is obtained in step 10 meaning that the radio communication with the sub-unit 200 is not resumed, then the routine proceeds to step 101 wherein it is determined whether the test transmission operation is continued for a given period of time or not. If a YES answer is obtained, then the routine proceeds to step 102 wherein the text transmission operation is stopped, and the facsimile image information stored in the image information memory 118 is printed out of the main unit 100. Additionally, the alarms 123 and 210 are activated to inform the facsimile operator of a failure of facsimile transmission to the sub-unit 200.

FIG. 4 is a sequential chart which shows signal transmission among the facsimile terminal equipment 300, the main unit 100, and the sub-unit 200.

As apparent from the drawing, the main unit 100 serves as a junction station which establishes facsimile transmission between the facsimile terminal equipment 300 and the sub-unit 200 during a time when the field strength of a radio signal received by the main unit 100 is maintained above the given level. If the field strength is decreased, causing the facsimile communication to be disabled, the main unit 100 serves as the auxiliary facsimile machine to establish facsimile transmission between itself and the facsimile terminal equipment 300.

When the facsimile transmission of the main unit 100 is completed, and when the field strength is increased to a level enough to resume the radio communication between the main unit 100 and the sub-unit 200, the main unit 100 transfers received facsimile information to the sub-unit 200. This makes it possible for the sub-unit 200 to receive the facsimile information transmitted from the facsimile machine after the radio communication with the main unit 100 is blocked, and print out it through the printer 206.

FIG. 5 shows a modification of the flowchart shown in FIG. 3.

The program is initiated in step 1 upon reception of a signal through the telephone line 350.

The routine proceeds to step 2 wherein a radio connection is established between the main unit 100 and the sub-unit 200.

The routine then proceeds to step 3 wherein it is determined whether the received signal is a facsimile signal from the facsimile terminal equipment 300 or not. If a YES answer is obtained, then the routine proceeds to step 4 wherein operation procedure signals are monitored which are moved between the facsimile machine 300 and the sub-unit 200 through the main unit 100 and the telephone line 350, and image information from the facsimile machine 300 is stored in the image information memory 118 of the main unit 100.

If a NO answer is obtained in step 3 meaning that the received signal is not a facsimile signal from the facsimile machine 300, then the routine proceeds to step 31 wherein the image transmission machine is subjected to a normal telephone mode.

After step 4, the routine proceeds to step 5 wherein it is determined whether the field strength is decreased below the preselected level or not.

If a NO answer is obtained meaning that a stable radio connection is established between the main unit 100 and the sub-unit 200, then the routine returns back to step 4. The main unit 100 then establishes radio communication between the telephone line 350 and the sub-unit 200 to transfer facsimile image information received from the facsimile machine 300 to the sub-unit 200 along with operation procedure signals and output operation procedure signals sent by the sub-unit 200 to the telephone line 350. The sub-unit 200 then starts to print out the facsimile image information from the facsimile terminal equipment 300.

Alternatively, if a YES answer is obtained meaning that the field strength of a radio signal received by the main unit 100 is decreased, causing the radio communication between the main unit 100 and the sub-unit 200 to be unstable, then the routine proceeds to step 6 wherein the radio communication is blocked.

The routine then proceeds to step 7 wherein the main unit 100 switches its operation mode to serve as the auxiliary facsimile machine to produce an operation procedure signal instead of the sub-unit 200 and output it to the facsimile machine 300. This maintains the facsimile communication regardless of a radio transmission condition between the main unit 100 and the sub-unit 200.

The steps so far are identical with those shown in FIG. 3.

In this embodiment, after step 7, the routine proceeds to step 103 wherein the main unit 100 prints out the facsimile image information stored in the image information memory 118 after completion of the facsimile operation in step 7, and the alarms 123 and 210 are activated to inform the facsimile operator that the facsimile image information has been printed out of the main unit 100.

With these operations, the main unit 100 serves as the auxiliary facsimile machine in place of the sub-unit 200 when it becomes difficult to establish radio communication with the sub-unit 200 to keep the facsimile transmission using the telephone line 350.

Figure 6A:
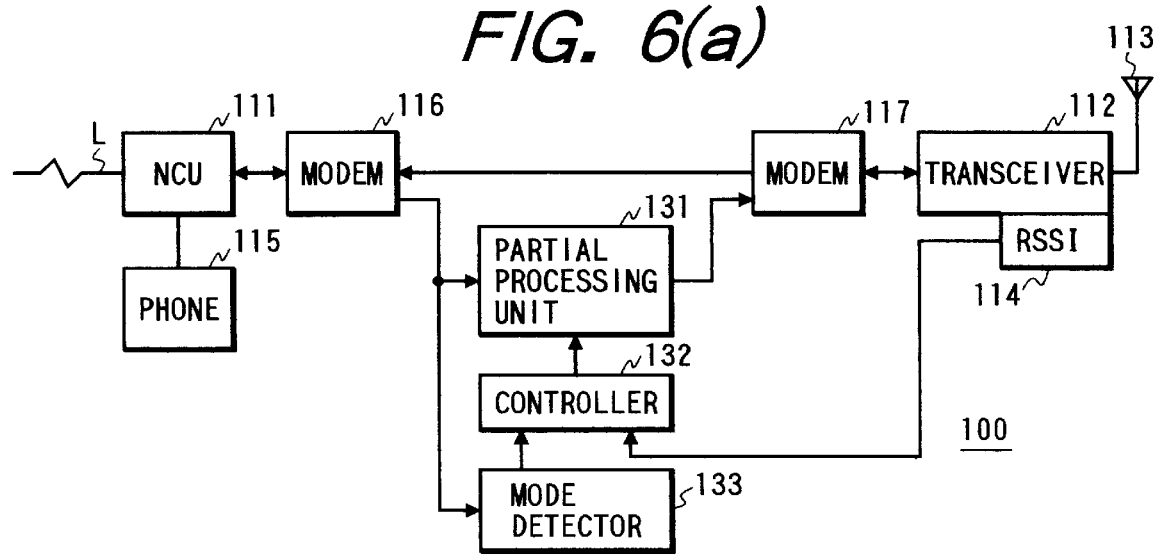
FIGS. 6(a) and 6(b) are circuit diagrams which show a main unit and a sub-unit of an image transmission apparatus according to the second embodiment.
Figure 6B:
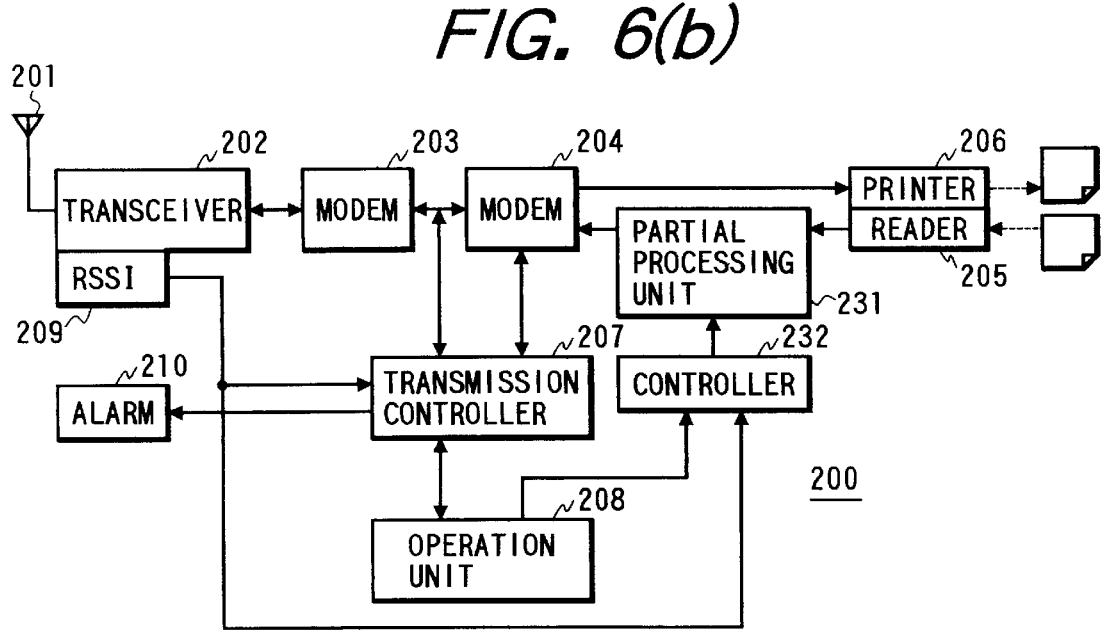

FIGS. 6(a) and 6(b) show a second embodiment of the image transmission apparatus.

The main unit 100 includes a network control unit (NCU) 111, modems 116 and 117, a transceiver 112, an antenna 113, a received signal strength indicator 114, a telephone set 115, a partial processing unit 131, a partial processing unit controller 132, and an image-reading mode detector 133.

The sub-unit 200 includes an antenna 201, a transceiver 202, a modem 203, a decoder/encoder (modem) 204, a document reader 205, an image printer 206, a received signal strength indicator 209, a sub-unit controller 207, an operation controlling unit 208, an alarm 210, and a partial processing unit 231, and a partial processing unit controller 232.

The main unit 100 serves as a radio junction station which establishes facsimile communication between the facsimile terminal equipment 300 and the sub-unit 200. Specifically, the main unit 100 transmits facsimile information received through the telephone line 350 along with an operation procedure signal to the sub-unit 200 through radio communication, and transmits an operation procedure signal send from the sub-unit 200 to the facsimile machine 300 through the telephone line 350.

Additionally, the main unit 100 also has the function of partially processing facsimile images transmitted from the facsimile terminal equipment 300 to be sent to the sub-unit 200 through radio communication by controlling the density of the facsimile images according to the field strength of a received signal detected by the received signal strength indicator 114 under operations of the partial processing unit 131, the partial processing unit controller 132, and the image-reading mode detector 133. The partial processing unit controller 132 variably sets the degree to which the partial processing unit 131 partially processes the facsimile images within a range determined by an image-reading mode signal transmitted along with received image information, according to the field strength detected by the received signal strength indicator 114.

Similarly, the sub-unit 200 has the function of partially processing facsimile images read out of a document through the document reader 205 to be transmitted to the main unit 100 through radio communication by controlling the density of the facsimile images according to the field strength of a received signal detected by the received signal strength indicator 209 under operations of the partial processing unit 231, the partial processing unit controller 232, and the operation control unit 208. The partial processing unit controller 232 variably sets the degree to which the partial processing unit 231 partially processes the facsimile images based on an image-reading mode indicative of the density of images set by the operation control unit 208, according to the field strength detected by the received signal strength indicator 209.

Figures 7, 8:
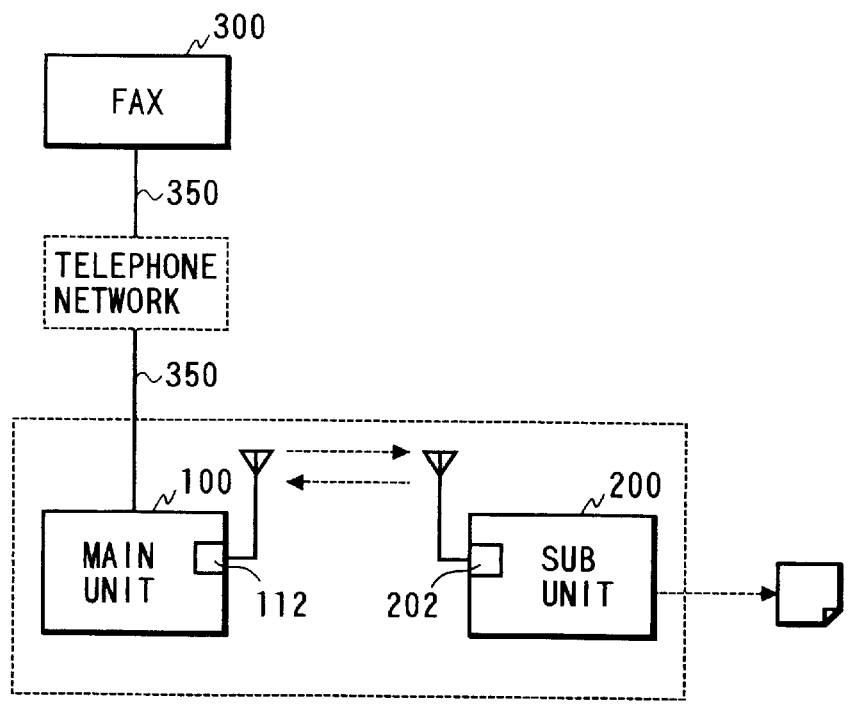
FIG. 7 is a table which shows the density of facsimile images to be transmitted by radio between a main unit and a sub-unit.
FIG. 8 is a block diagram which shows a conventional image transmission apparatus.

FIG. 7 shows a range within which the density of radio-transmitting images can be changed.

As will be apparent from the drawing, the radio-transmitting image density is determined by partially processing transmitting images according to the field strength of a received signal within a range set by each of the image-reading modes. For instance, if the image-reading mode represents a fine mode, the radio-transmitting image density may be set in three grades: R8×7.7 dot/mm, R8×5.775 dot/mm, and R8×3.85 dot/mm according to a level of the field strength (i.e., high, mid, or low).

With the above arrangements, the image transmission apparatus of the second embodiment transmits a facsimile image signal and an operation procedure signal in the form of radio signals from the main unit 100 to the sub-unit 200 and vice versa, and detects the field strength of the radio signals to partially process transmission image information according to the detected field strength for optimizing transmission loads on the main unit 100 and the sub-unit 200 according to a radio transmission condition between the main unit 100 and the sub-unit 200. Further, the setting of the variable range of the radio-transmitting image density in each of the image-reading modes prevents images, as required to be transmitted in high density, from being subjected to the partial processing undesirably.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An image transmission apparatus comprising:

a first unit having a facsimile function;

a second unit receiving a facsimile signal from a calling party's facsimile machine through a telephone line, said second unit operating in a radio transmission mode and a facsimile mode, the radio transmission mode being to transmit the received facsimile signal together with an operation procedure signal to said first unit using a radio signal and also to transmit to the calling party's facsimile machine through the telephone line an operation procedure signal sent via a radio signal from said first unit to said second unit for establishing facsimile communication between the calling party's facsimile machine and said first unit, the facsimile mode being to establish facsimile communication with the calling party's facsimile machine instead of said first unit;

field strength detecting means for detecting a level of field strength of the radio signal transmitted from said first unit to said second unit; and switching means for switching between the radio transmission mode and the facsimile mode of said second unit according to the level of the field strength detected by said field strength detecting means, said switching means controlling said second unit so as to operate in the facsimile mode in communication with the calling party's facsimile machine when the detected level of the field strength becomes smaller than a preselected level, wherein said second unit includes a memory for storing therein the facsimile signal in the facsimile mode, said second unit transmitting the facsimile signal stored in the memory to said first unit after completion of the facsimile communication with the calling party's facsimile machine in the facsimile mode when the field strength detected by said field strength detecting means exceeds the preselected level, and said second unit has printing means for printing out the facsimile signal received in the facsimile mode.

2. An image transmission apparatus comprising:

a main unit provided to be connected to a telephone line for receiving facsimile image information;

a sub-unit performing a facsimile operation;

radio communication establishing means for establishing radio communication between said main unit and said sub-unit to transfer facsimile image information and an operation procedure signal via a radio signal from said main unit to said sub-unit;

field strength detecting means for detecting a field strength of the radio signal; and partially processing means responsive to the field strength detected by said field strength detecting means for partially processing the facsimile image information transmitted from said main unit to said sub-unit when the detected field strength is less than a predetermined value.

3. An image transmission apparatus as set forth in claim 2, further comprising transmission image density control means for controlling said partially processing means to adjust the density of a facsimile image provided by the facsimile image information transmitted from said main unit to said sub-unit according to the field strength detected by said field strength detecting means and an image-reading density signal provided by the calling party's facsimile machine.

4. An image transmission apparatus as set forth in claim 2, further comprising an image reading unit provided in said sub-unit for reading a facsimile image of a document, image-reading density selecting means for selecting between a higher density mode and a lower density mode, and transmission image density control means for controlling said partially processing means to adjust the density of the facsimile image read by said image reading unit to be transmitted to said main unit according to the field strength detected by said field strength detecting means and one of the higher density mode and the lower density mode selected by said image-reading density selecting means.

* * * * *